United States Patent [19]

Hu et al.

[11] Patent Number: 5,277,812
[45] Date of Patent: Jan. 11, 1994

[54] INTER-PENETRATING NETWORK CHARGE MODIFIED MICROPOROUS MEMBRANE

[75] Inventors: Hopin Hu, Ann Arbor, Mich.; Chung-Jen Hou, Pensacola, Fla.

[73] Assignee: Gelman Sciences Inc., Ann Arbor, Mich.

[21] Appl. No.: 17,036

[22] Filed: Feb. 12, 1993

[51] Int. Cl.$^5$ .............................................. B01D 71/68
[52] U.S. Cl. ................. 210/500.41; 210/651
[58] Field of Search ............ 210/635, 645, 490, 500.39, 210/500.41, 651; 521/27; 204/299 R; 427/245; 264/41. 49

[56] References Cited

U.S. PATENT DOCUMENTS

| | | | |
|---|---|---|---|
| 4,007,113 | 2/1977 | Ostreicher | 210/23 R |
| 4,473,474 | 7/1984 | Ostreicher | 210/636 |
| 4,473,475 | 9/1984 | Barnes | 210/638 |
| 4,673,504 | 6/1987 | Ostreicher | 210/500.22 |
| 4,708,803 | 11/1987 | Ostreicher | 210/650 |
| 5,151,189 | 9/1992 | Hu | 210/635 |

*Primary Examiner*—Frank Spear
*Attorney, Agent, or Firm*—Krass & Young

[57] ABSTRACT

Hydrophilic inter-penetrating network charge modified microporous membranes are provided as well as a method of preparing the membranes by casting a membrane matrix blend containing matrix polymer, a solvent system, a wetting polymer compatible with the matrix polymer, and a charge modified system which forms a cross-linked inter-penetrating network structure within the microporous membrane substrate during the membrane fabrication process which network structure optionally can be locked in by heat curing. The membranes are useful for filtering ultra pure water with 18 megaohm-cm resistivity for the electronic industry, and they can also be used for the removal of a variety of contaminants from fluid media, such as very fine negatively charged particles, bacteria and endotoxins, with greatly enhanced filtration efficiency.

12 Claims, No Drawings

INTER-PENETRATING NETWORK CHARGE MODIFIED MICROPOROUS MEMBRANE

FIELD OF THE INVENTION

This invention relates to novel hydrophilic charge modified microporous membranes useful for filtration of a variety of fluids, such as ultra pure water, biological fluids, and the like.

BACKGROUND OF THE INVENTION

Microporous membranes are usually defined as thin walled structures having an open spongy morphology with a narrow pore size distribution. The mean pore sizes for microporous membranes typically range between 0.01 μm and 10 μm; although it is to be understood that the principles of the present invention are applicable to membranes having a still greater range of porosities. Traditionally, microporous membranes are useful to remove fine contaminants from liquid and gas media. The particulate material, such as dust or bacteria, can be removed by a microporous membrane filter through the mechanical sieving mechanism. In this mechanism, the filtration efficiency is controlled by the relative size of the particulate and membrane pore size. To achieve absolute particle retention, a microporous membrane with fine pore size is required to meet the requirement of pharmaceutical and electronic industries. However, membranes with such a fine pore size tend to have undesirable characteristics of high pressure drop across the membrane, lower flow rate, reduced dirt capture capacity, and shortened membrane life. The suspended particulate materials can also be removed from the fluid by electrokinetic adsorption mechanism. Most suspended particulate materials which are commonly encountered in industrial practice have a negative zeta potential. Such contaminants can be removed from the fluid by the electrokinetic adsorption mechanism. By imparting a positive zeta potential to the surface of filter membranes, the particulates capture efficiency can be greatly improved. This is true even for particulates whose size is much smaller than the membrane pore size. As a result, the membrane filter with charge modification has a better fluid flow rate and a longer filter life than a membrane filter with a comparable pore size rating but without any surface modification.

Conventional cationic charge modified microporous membranes for the filtration of ultra pure water typically have a proper charge density, but a poor 18 megaohm-cm water resistivity recovery. U.S. Pat. No. 4,702,840 to Degen discloses charge modified membranes prepared by casting acidic polymer solution comprising a matrix polymer and a primary activated polymer having epoxy functional groups on a supportive material to form a thin film, followed by immersing the film in a liquid bath. The resulting nascent membranes are washed in water and finally dried in an oven. During this membrane fabrication process, epoxy functional groups of the primary activated polymer available for the reaction with amino or carboxyl functional groups of the polyamide matrix polymer will be deactivated through an acid-catalyzed ring-opening reaction due to the presence of acidic solvent. Therefore, complete grafting of the primary activated polymer on the polyamide membrane surface can be a problem.

It is an object of the present invention to provide charge modified microporous membranes for filtration applications, particularly the filtration of ultrapure water used in the manufacture of computer chips in the electronic industry where a fast 18 megaohm-cm water resistivity recovery is an important requirement.

SUMMARY OF THE INVENTION

The invention concerns a hydrophilic charge modified microporous membrane having a cross-linked structure of an inter-penetrating polymer network within the membrane. The membrane comprises a homogeneous matrix blend of polyethersulfone (PES), polyvinylpyrrolidone (PVP), polyfunctional glycidyl ether, and a polymeric amine such as polyethyleneimine (PEI). The membrane is unique in that it is cationic charge modified, and possesses low membrane extractables and fast 18 megaohm-cm water resistivity recovery. The invention further concerns a method of making the membrane comprising the steps of casting a solution of the polymers and active ingredients in a thin film, precipitating, washing and drying the polymer as a finished dried microporous membrane, thereby achieving the cross-linked structure of the inter-penetrating polymer network within the membrane, and optionally in a final step, thermal-baking the resulting dried membrane to stabilize the cross-linked structure of the inter-penetrating polymer network within the membrane.

DETAILED DESCRIPTION OF THE INVENTION

The invention in one preferred aspect concerns a hydrophilic inter-penetrating network cationic charge modified microporous filtration membrane that has low membrane extractables and allows fast recovery of ultrapure water resistivity. The membrane has a microporous membrane substrate, preferably isotropic, having therewithin a cross-linked inter-penetrating polymer network structure. The substrate is formed by casting in a film a polymer matrix blend solution comprising polyethersulfone, polyvinylpyrrolidone, polyfunctional glycidyl ether, and polyethyleneimine, precipitating the resulting film as a membrane having said network structure in a quench bath, and washing and drying the thus precipitated membrane. In a preferred embodiment, the dried membrane is baked sufficiently to stabilize said network structure. A preferred PES resin (sold under the trade name Ultrason E-6010, BASF Corp.) has the chemical structure I:

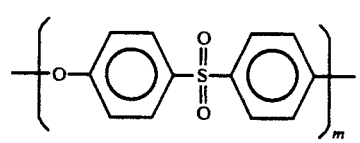

where m is an integer in the range from 30 to 1000. PES resin having properties similar to the preferred one can also be used. A preferred PVP resin (sold under the trade name Plasdorie K-90, GAF Chemical Corp.) has a molecular weight of 700,000. The PVP resin has the chemical structure II:

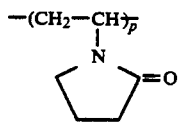

where p is an integer in the range of 360 to 6300. PVP resins having properties similar to the preferred one can also be used. A preferred PEI resin (sold under the tradename Corcat P-600, Hoechst Celanese Corp.) has a molecular weight of 60,000 and the chemical structure III:

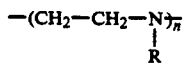

where n is an integer in the range of 900-1400, and R is hydrogen or a continuation of the polyamine chain. Other polyfunctional organic amines having chemical properties similar to the preferred one can also be used such as tetraethylene pentamine, pentaethylene hexamine and the like. A preferred polyfunctional aliphatic glycidyl ether resin is 1,4-butanediol diglycidyl ether (sold under the tradename Heloxy 67, Rhone-Poulenc Corp.), and has the molecular structure IV:

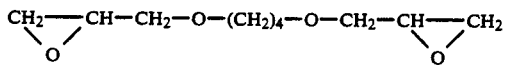

Other aliphatic diglycidyl ether resins which chemically behave similarly to the above 1,4-butanediol diglycidyl ether can also be used in this invention. This includes polyfunctional aromatic diglycidyl ether resins and the like. A preferred membrane is one wherein the matrix blend comprises by weight about 60-95% of PES resin, about 0-25% of PVP resin, about 0.1-20.0% of PEI resin, and about 0.1-20.0% of polyfunctional aliphatic glycidyl ether resin based upon the total amount of these resins included in the blend. In the preferred relative amounts, it is found that the membrane so prepared is hydrophilic and cationically charged. Its hydrophilicity and cationic charge density will stay unchanged even after isopropanol Soxhlet extraction for 24 hours, 120° C. autoclaving for 40 minutes, or boiling in deionized water for one hour.

Polymeric amines or polyfunctional organic amines impart not only charge capacity but also hydrophilicity to the microporous membrane. The invention contemplates the use of PVP homo-polymer and PVP copolymer. The use of PVP homo-polymer, which is compatible with PES resin, can impart water wettability to the membrane. The use of PVP co-polymer, such as Gafquat 355 N or 734 (sold under the tradename Gafquat, GAF Chemicals Corp.), can impart both water wettability and enhanced charge capacity to the membrane. Gafquat 755 N or 734 is a quaternized copolymer of vinyl pyrrolidone and dimethylaminoethyl methacrylate with very high molecular weight .The membrane prepared from formulation containing Gafquat charged polymer alone without the use of ingredients required to form a cross-linked network did not show a good 18 megaohm-cm water resistivity recovery. However, the membrane prepared from the formulation containing Gafquat charged polymer as well as polyfunctional glycidyl ether and organic polyamine did show a better 18 megaohm-cm water resistivity recovery. It is believed that in the process of the present invention, the Gafquat charged polymer is firmly trapped within the inter-penetrating, interlocked crosslinked network due to (1) strong interaction, such as hydrogen bonding or charge-dipole interaction, between the Gafquat charged polymer and the cross-linked network, and (2) entanglement between polymer chains. The resulting charge modified microporous membrane shows a low ph-dependency in its charge capacity because of the presence of quaternized polymer. Only very few quaternized polymer resins are compatible with the polyethersulfone membrane mix. Gafquat type charged resins are preferred.

Although the results obtained from these experiments suggest the advantages of PVP homo-polymer or copolymer in the polymer blend to prepare the hydrophilic cationic charge modified membranes, there is no requirement that the present invention be restricted to the use of this material. Very high quality charge modified membranes may be prepared from PES, PEI and the epoxy.

One important feature of this invention is the fact that the membrane is not post-treated, but is prepared by casting a polymer blend. For comparison, an uncharged membrane of similar pore size to a preferred membrane of the invention was first prepared by casting polymer solution lacking both PEI resin and polyfunctional aliphatic glycidyl ether resin, and then post-treating with coating solution containing PEI and polyfunctional aliphatic glycidyl ether, followed by thermal curing to prepare the cationic charge modified membrane analogous to the preferred membrane. This comparison membrane showed a much slower 18 megaohm-cm water resistivity recovery and a lower cationic charge density evidenced by dye adsorption than the preferred membrane according to this invention. Thus shows that the membrane performance varies as the membrane fabrication process is altered even if the chemistry used is similar.

Reasons for the low extractables property of cationic charge modified polyethersulfone microporous membranes of the invention are speculated to be as follows:
1) the formation of cross-linked inter-penetrating, interlocked charged network within the microporous membrane substrate;
2) the direct reaction between the reactive sites of charged cross-linked network and the reactive end groups of polyethersulfone polymer;
3) very strong interaction, such as hydrogen bonding or charge-dipole interaction, between the charged cross-linked network containing amino or hydroxyl groups and microporous membrane substrate as well as wetting agents, such as PVP homo-polymer or co-polymer.

The invention in another preferred aspect concerns a method of preparing a hydrophilic cationic charge modified microporous membrane having a cross-linked inter-penetrating polymer network structure in the membrane. The method includes the step of forming a solution of a blend of PES, PVP, PEI, and aliphatic diglycidyl ether in a suitable solvent, preferably a solvent such as N-methylpyrrolidone, dimethyl formamide, or mixture thereof. Any of various suitable art-recognized additives or solvent mixtures may be included in the polymer solution, of which polyethylene glycol is preferred. A thin film of the polymer solution is formed by casting onto a support and the film is precipitated as a microporous membrane, dried at relatively low temperature, and as a preferred option to stabilize the network structure, is finally heat-treated at relatively high temperature. More particularly, the polymer solution is cast as a liquid film on a suitable support such as a glass plate or a moving stainless-steel belt and subjected to conditions of controlled air velocity, temperature, and relative humidity. The liquid film of the polymer imbibes sufficient water to affect initial precipitation of polymer from the solvent. Final precipitation, which forms the microporous membrane, occurs in a quench bath which contains a non-solvent such as water or a non-solvent mixture such as water-alcohol. The formed microporous membrane is dried in an oven suitably at about 70° C., and finally heat-treated or baked sufficiently to stabilize the network structure, preferably carried out a temperature from 90°-140° C. for 1 to 48 hours, more preferably for at least 3 hours and most preferably for at least 8 hours. A preferred temperature is about 120° C.

Another unique aspect of the invention results from the final heat treatment at elevated temperature. It was found that the unbaked membrane which did not experience the final thermal baking showed a much slower 18 megaohm-cm water resistivity recovery than did membranes which were heated as described above. However, unheated membranes do generally have a higher cationic charge density (as determined by the anionic dye adsorption) than the membranes heated for the described stabilization of the network structure.

PEI polymer will react with epoxy functional groups of diglycidyl ether resin to form a cross-linked material which has a high degree of insolubility. The reaction rate can be enhanced by various methods including heating. During the polymer solution preparation process, it can be reasonably assumed that PEI polymer and diglycidyl ether resin are uniformly dissipated in the homogeneous polymer solution of PES, PVP, polyethylene glycol, and other ingredients. The complete reaction of PEI polymer and the diglycidyl ether molecule is restricted at this stage because of the high viscosity of the polymer solution system and the low concentration that is used of these two resins. As the phase inversion process progresses, the partially cross-linked reaction adduct entangles the PES polymer to form an inter-penetrating network. As a result, the formed membrane after drying comprises a uniform interlocked structure of reaction adduct with PES. The complete reaction of PEI polymer and diglycidyl ether is then accomplished by the subsequent thermal baking at higher temperature. While the above is a plausible mechanism proposed for this invention, it has not been rigorously proven so that the invention is not limited to this or any other theory. Nevertheless, the mechanism can satisfactorily explain the fact that the further baked membrane has a faster 18 megaohm-cm water resistivity recovery than the unbaked membrane because of the consequence of lower extractables attributed to complete reaction. The lower cationic charge density associated with the further baked membrane is presumably due to gradual decomposition of cross-linked PEI adduct in the membrane structure.

DEFINITIONS

Water Bubble Point—This common test for microporous membrane is a measurement of the largest pores in a membrane. It consists of expelling water from a water-wetted membrane by air pressure. Pore size and the pressure necessary to remove water from that pore are related by:

$$D = B\gamma\cos\theta/P$$

where P is the pressure, $\theta$ is the water-solid contact angle between the membrane material and water, $\gamma$ is water-air surface tension, D is pore diameter, and B is a constant.

Isopropanol/Water Bubble Point—The water bubble point is not practically suitable for characterizing the pore size of tight microporous membranes due to the safety concern in most laboratory. Therefore, a alcohol mixture, i.e., isopropanol/water (60/40, by volume) is used to characterize the tight membranes in this invention.

Water Flow Rate—Water flow rate is the flow rate of water passing through the membrane of given dimension, and commonly expressed in seconds/100 ml of water at a given pressure.

Dye Adsorption—Membrane surfaces which have a positive zeta potential will adsorb negatively charged organic dyes. This can be used to semi-quantify the charging efficiency of charged membrane.

Extractables—The amount of extractables is determined by boiling the membrane in water for one hour and measuring the weight loss.

EXAMPLES

Example 1—Preparation of 0.1 μm Hydrophilic Polyethersulfone Membrane

Polyethersulfone (Ultrason E-6010 available from BASF), dimethyl formamide, polyethylene glycol 400, and polyvinyl pyrrolidone were mixed in the ratio of 17.5:20.0:61.2:1.3. The mixture was stirred to homogeneity and cast at 7-10 mil on glass or stainless steel plate. It was subjected to 60-70% relative humidity ambient air until it became opaque. The film was then immersed in water to complete coagulation and leach out excess solvent for 2-12 hours. It was then dried at ambient to 70° C. The membrane obtained wa.5 spontaneously water wettable. The membrane characteristics were:

Isopropanol/Water Bubble Point: 44 psi.
Water Flow Rate: 110 seconds/9.62 cm$^2$, 100 ml at 10 psi.

Example 2—Preparation of 0.1 μm Cationically Charged Polyethersulfone Membrane

The membrane made in Example 1 was placed in an aqueous solution containing 1.0% of polyethylene imine (Corcat P-600, available from Hoechst Celanese), and 2.35% of 1,4-butanediol diglycidyl ether (Heloxy 67, available from Rhone-Poulenc) for a few minutes, and then was removed from the coating solution. Excess polymer solution was wiped off from the membrane using squeegee bars.

The membrane was then baked in a vented oven at 115° C. for one hour. After baking, the membrane was washed with deionized water at 90° C. for 20 minutes and finally dried at 70° C. for 20 minutes. The membrane performance was:

Isopropanol/Water Bubble Point: 45 psi.
Water Flow Rate: 120 seconds/9.62 cm$^2$, 100 ml at 10 psi.

The membrane so prepared had cationic charge evidenced by anionic dye adsorption. However, the modified membrane showed a relatively slower 18 megaohm-cm water resistivity recovery than those made according to the present invention.

Example 3a—Preparation of 0.1 μm Cationically Charged Polyethersulfone Membrane A polymer casting solution was prepared according to the invention by mixing polyethersulfone, polyvinylpyrrolidone, polyethylene glycol 400, dimethyl formamide, polyethylene imine (Corcat P-600, available from Hoechst Celanese), and 1,4-butanediol diglycidyl ether (Heloxy 67 available from Rhone-Poulenc) in the ratio of 16.0:1.2:62.6:19.0:0.8:0.4. The polymer solution was cast on a glass plate and set as Example 1. The membrane so prepared was instantly water wettable and cationically charged, and had the characteristics as follows:

Isopropanol/Water Bubble Point: 42 psi.
Water Flow Rate: 123 seconds/9.62 cm$^2$, 100 ml at 10 psi.

Example 3b—Preparation of 0.1 μm Cationically Charged Polyethersulfone Membrane A polymer casting solution was prepared by mixing polyethersulfone, quaternized polymer (Gafquat 755 N, available from GAF Chemical Corp.), polyethylene glycol 400, dimethyl formamide, polyethylene imine, and 1,4-butanediol diglycidyl ether together in the ratio of 17.0:2.6;60.5:18.6:0.9:0.4. The polymer solution was cast on a glass plate and set as Example 1 . The membrane so prepared was instantly water wettable and cationically charged, and had the characteristics as follows:

Isopropanol/Water Bubble Point: 39 psi.
Water Flow Rate: 102.8 seconds/9.62 cm$^2$, 100 ml at psi.

Example 4—Preparation of 0.1 μm Cationically Charged Polyethersulfone Membrane The preparation procedure of this membrane are the same as those described in Example 3a except that the membrane after drying at 70° C. was further oven-baked at 120° C. for one hour. The membrane so prepared was spontaneously water wettable and cationically charged, and had the following characteristics:

Isopropanol/Water Bubble Point: 44 psi.
Water Flow Rate: 130 seconds/9.62 cm$^2$, 100 ml at 10 psi.

Example 5—Preparation of 0.03 μm Cationically Charged Polyethersulfone Membrane A casting solution was prepared by mixing polyethersulfone, polyvinylpyrrolidone, polyethylene glycol 400, dimethyl formamide, polyethylene imine, and 1,4-butanediol diglycidyl ether together in the ratio of 20.7:1.1:58.0:19.0:0.8:0.4. The polymer solution was cast on a glass plate and set as in Example 1. The membrane so obtained was hydrophilic and cationically charged as evidenced by anionic dye adsorption. The membrane performance was as follows:

Isopropanol/Water Bubble Point: 66.7 psi.
Water Flow Rate: 267 seconds/9.62 cm$^2$, 100 ml at 10 psi.

Example 6—Preparation of 0.03 μm Cationically Charged Polyethersulfone Membrane The membrane was prepared in the same manner as described in Example 5 except that the membrane after drying at 70° C. was further oven-baked at 120° C. for 48 hours. The membrane so prepared was instantly water wettable and cationically charged, and had the following characteristics:

Isopropanol/Water Bubble Point: 66 psi.
Water Flow Rate: 260 seconds/9.62 cm$^2$, 100 ml at 10 psi.

After Soxhlet extraction using isopropanol for 24 hours, the membrane did not lose its instant water wettability, flow rate, and cationic charge capacity.

Example 7—Preparation of 0.2 μm Cationically Charged Polyethersulfone Membrane A polymer casting solution was prepared by mixing polyethersulfone, polyvinylpyrrolidone, polyethylene glycol 400, dimethyl formamide, polyethylene imine, 1,4-butanediol diglycidyl ether together in the ratio of 12.9:0.6:61.6:23.7:0.8:0.4. The polymer solution was cast on a glass plate and set as in Example 1. The membrane so prepared was instantly water wettable and cationically charged, and had the characteristics as follows:

Water Bubble Point: 62.7 psi.
Water Flow Rate: 23.2 seconds/9.62 cm$^2$, 100 ml at 10 psi.

Example 8—Preparation of 0.45 μm Cationically Charged Polyethersulfone Membrane A polymer casting solution was prepared by mixing polyethersulfone, polyvinylpyrrolidone, polyethylene glycol 400, dimethyl formamide, polyethylene imine, 1,4-butanediol diglycidyl ether together in the ratio of 9.4:2.7:63.5:23.2:0.8:0.4. The polymer solution was cast on a glass plate and set as in Example 1. The membrane so prepared was instantly water wettable and cationically charged, and had the characteristics as follows:

Water Bubble Point: 41.3 psi.
Water Flow Rate: 10.1 seconds/9.62 cm$^2$, 100 ml at 10 psi.

Example 9—Preparation of 0.8 μm Cationically Charged Polyethersulfone Membrane A polymer casting solution was prepared by mixing polyethersulfone, polyvinylpyrrolidone, polyethylene glycol 400, dimethyl formamide, polyethylene imine, 1,4-butanediol diglycidyl ether together in the ratio of 9.4:0.5:63.0:25.2:1.3:0.6. The polymer solution was cast on a glass plate and set as in Example 1. The membrane so prepared was instantly water wettable and cationically charged, and had the characteristics as follows:

Water Bubble Point: 22.1 psi.
Water Flow Rate: 4.3 seconds/9.62 cm$^2$, 100 ml at 10 psi.

Example 10—Anionic Dye Adsorption Membrane

Dye adsorption test was done with dilute aqueous solution (10 ppm) of a negatively charged Metanil Yellow. The solution was filtered through the test samples (47 Mm in diameter) at 10 psi and the end point of testing was visually determined and expressed in terms of volume of dye solution when the filtrate penetrating through membrane samples became very light yellow. The accuracy of this dye adsorption test was about 5 ml of dye solution. The dye adsorption capacity of membrane samples are set out in Table 1 below.

TABLE I

DYE ADSORPTION CAPACITY OF VARIOUS MEMBRANES

| Membrane Sample of Example # | Volume of 10 PPM of Metanil Yellow Dye Adsorption (ml) |
| --- | --- |
| 1 | 5 |
| 2 | 23 |
| 3a | 41 |
| 3b | 42 |
| 4 | 40 |
| 5 | 40 |
| 6 | 15 |
| 7 | 15 |
| 8 | 10 |
| 9 | 19 |

Example 11—Measurement of 18 megaohm-cm Water Resistivity Recovery

A 293-min diameter disc of membrane sample was installed in a stainless steel housing which allowed pressurized water to flow through the membrane sample. Prefiltered and deionized 18 megaohm-cm water was caused to flow through the membrane sample at a constant flow rate of 0.9–1.0 gallons per minute. The effluent resistivity was constantly monitored. The length of time which was required to reach the same resistivity level as upstream was determined and recorded. The test results of membrane samples were summarized in Table II below.

TABLE II

RESISTIVITY RECOVERY

| Membrane Sample Example # | Flush Out Time to 18 Megaohm-cm (minutes) |
| --- | --- |
| 1 | 4–8 |
| 5 | 14.5–35.0 |
| 6 | 2.5–10.5 |

Example 12—Measurement of Membrane Extractables

The degree of extractables of hydrophilic cationically charged polyethersulfone membranes was determined by pre-weighing the dry membrane samples, then by boiling them in DI water for 1 hour. After completely drying, the membrane extractables is expressed in terms of percentage weight loss and shown in Table III below.

TABLE III

MEMBRANE EXTRACTABLES

| Membrane Sample of Example # | Extractables % |
| --- | --- |
| 5 | 0.145 |
| 6 | 0.118 |

Example 13—Comparison of Membrane Performance Before and After Extraction With Boiling Water The cationically charged polyethersulfone membranes prepared from Example 6, all in the form of 47-mm disks, were subjected to extraction with boiling water as in Example 12. The membrane performance before and after extraction with boiling water is shown in Table IV.

TABLE IV

| Membrane Sample | Before Extraction | After Extraction |
| --- | --- | --- |
| Dye adsorption capacity (10 PPM of Metanil Yellow) | 15 ml | 13 ml |
| Isopropanol/water bubble point | 66.0 psi | 65.3 psi |
| Water flow rate (seconds/9.62 cm², 100 ml at 10 psi) | 260.0 | 255.6 |

It will then be seen that the present invention provides unproved, cationically charged porous membranes. The membranes have a very low level of extractable materials retained therein. They retain a high degree of charge and possess good flow properties. This combination of properties makes them ideally suited for use in preparing high purity water for the semiconductor industry. In addition, the simplified method by which they are produced results in a significant saving of time and money.

It should be appreciated that the foregoing discussion, description and examples are meant to illustrate particular embodiments of the invention and are not meant to be limitations on the practice thereof. It is the following claims, including all equivalents, which define the scope of the invention.

We claim:

1. A hydrophilic inter-penetrating network cationic charge modified microporous filtration membrane that has low membrane extractables and allows fast recovery of ultrapure water resistivity, comprising:

a microporous membrane matrix blend, having therewithin a cross-linked inter-penetrating polymer network structure, said matrix blend being formed by casting in a film of blended polymer membrane solution comprising polyethersulfone, polyvinylpyrrolidone, polyfunctional glycidyl ether, and polyethyleneimine, precipitating the resulting film as a membrane having said network structure in a quench bath, and washing and drying the thus precipitated membrane.

2. A membrane according to claim 1, comprising baking the dried membrane sufficiently to stabilize said network structure.

3. A filtration membrane according to claim 2, wherein said polyethersulfone has the chemical structure I;

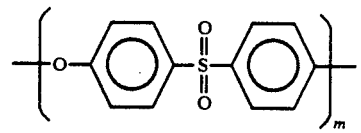

where m is an integer in the range from 30 to 1000.

4. A filtration membrane according to claim 2, wherein said polyvinylpyrrolidone has the chemical structure II:

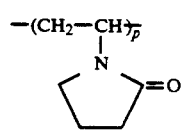

where p is an integer in the range from 360 to 6300.

5. A filtration membrane according to claim 2, wherein said polyethyleneimine has the chemical structure III:

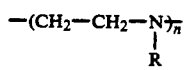

where n is an integer in the range from 900 to 1400 and R is hydrogen or a continuation of the polymer chain.

6. A filtration membrane according to claim 2, wherein said polyfunctional glycidyl ether is 1,4-butanediol diglycidyl ether having the chemical structure IV:

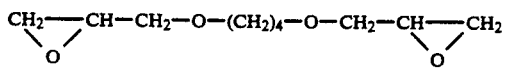

7. A method of preparing a hydrophilic charge modified microporous membrane having a network structure according to claim 2, comprising baking the dried membrane sufficiently to stabilize said network.

8. A filtration membrane according to claim 1, wherein said polyethersulfone has the chemical structure I:

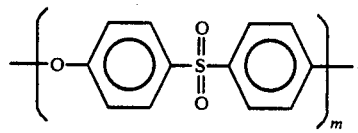

where m is an integer in the range from 30 to 1000.

9. A filtration membrane according to claim 1, wherein said polyvinylpyrrolidone has the chemical structure II:

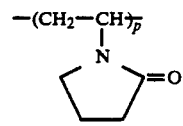

where p is an integer in the range from 360 to 6300.

10. A filtration membrane according to claim 1, wherein said polyethyleneimine has the chemical structure III:

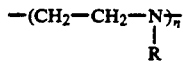

where n is an integer in the range from 900 to 1400 and R is hydrogen or a continuation of the polymer chain.

11. A filtration membrane according to claim 1, wherein said polyfunctional glycidyl ether is 1,4-butanediol diglycidyl ether having the chemical structure IV:

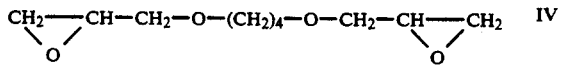

12. A method of preparing a hydrophilic charge modified microporous membrane having a network structure according to claim 1, comprising the steps of forming a polymer solution of a blend of polyethersulfone, polyvinylpyrrolidone, polyethyleneimine, and aliphatic diglycidyl ether in a solvent, forming a thin film of said polymer solution, precipitating the resulting film as a membrane having said network structure, and washing and drying the thus precipitated membrane.

* * * * *

UNITED STATES PATENT AND TRADEMARK OFFICE
CERTIFICATE OF CORRECTION

PATENT NO. : 5,277,812
DATED : January 11, 1994
INVENTOR(S) : Hopin Hu, et. al.

It is certified that error appears in the above-indentified patent and that said Letters Patent is hereby corrected as shown below:

Column 2, line 66, delete "Plasdorie" and insert --Plasdone--;

Column 3, line 55, delete "355" and insert --755--;

Column 4, line 37, delete "Thus" and insert --This--;

Column 6, line 42, delete "wa.5" and insert --was--;

Column 7, line 28, delete "2.6;60.5" and insert --2.6:60.5--;

Column 7, line 34, delete "at psi" and insert --at 10 psi--;

Column 9, line 20, delete "293-min" and insert --293-mm--;

Signed and Sealed this

Ninth Day of August, 1994

Attest:

BRUCE LEHMAN

Attesting Officer           Commissioner of Patents and Trademarks